United States Patent [19]
Flanary

[11] 3,860,090
[45] Jan. 14, 1975

[54] MOBILE CONSTRUCTION MACHINE GREASING ASSEMBLY

[75] Inventor: Ellis R. Flanary, Richmond, Va.

[73] Assignee: Flanary Industries, Inc., Richmond, Va.

[22] Filed: June 20, 1973

[21] Appl. No.: 371,863

[52] U.S. Cl. .................................. 184/7 C, 184/36
[51] Int. Cl. ........................... F16n 1/00, F16n 7/14
[58] Field of Search ............ 184/7 C, 7 CR, 29, 36, 184/39, 105 R, 27 R, 105 A; 141/67, 231; 222/538

[56] References Cited
UNITED STATES PATENTS

| | | | |
|---|---|---|---|
| 1,868,800 | 7/1932 | Kreidel | 184/29 |
| 2,416,819 | 3/1947 | Clapp | 222/538 X |
| 2,627,320 | 2/1953 | Rotter | 184/29 X |
| 3,062,320 | 11/1962 | Armstrong | 184/7 C |
| 3,062,321 | 11/1962 | Spierckel | 184/7 C X |

*Primary Examiner*—Manuel A. Antonakas
*Attorney, Agent, or Firm*—Auzville Jackson, Jr.

[57] ABSTRACT

A mobile construction machine having associated therewith a self-contained greasing assembly driven by pressurized air produced by the construction machine for readily and conveniently and efficiently applying grease to the numerous grease points of the machine. The greasing assembly is provided as an intergral box and attached directly to the machine. The box has two separate compartments therein, one for the grease and the other for storage of the hose, which supplies the grease to the points of use.

10 Claims, 6 Drawing Figures

MOBILE CONSTRUCTION MACHINE GREASING ASSEMBLY

BACKGROUND OF THE INVENTION

The present invention relates to a prime mover greasing assembly which permits the prime mover to be greased in an efficient, economical and convenient manner from the self-contained greasing assembly which is driven by a source of pressurized air created by the prime mover itself.

At the present time numerous prime movers such as front-end wheel loaders, dump trucks, double barrel pan loaders, cranes and other mobile construction machines are used in the dusty environment of road building and construction sites where they require constant attention to maintain adequate lubrication of the various moving parts.

A typical example is that of a front end wheel loader of the type shown in the drawings of this application which has 53 service points (herein referred to as "grease" points) requiring a ball and roller bearing, lubricant (herein referred to as "grease"), to be applied thereto oftentimes as frequently as every 10 hours the vehicle is in service. Thus, every day in a typical operation a number of the service points must be greased.

Heretofore, this was typically done by using a portable, manually operated hand held grease gun with a typical consumption of time of approximately 30 minutes or longer to do the normal lubricating of the ball and roller bearing grease points. Since these vehicles can cost many thousands of dollars, the time that they are taken out of useful service is quite costly and there has been a long felt need heretofore unrealized for a rapid, efficient and economical method of lubricating these machines at the job site. For example, some machines could produce $70 worth of income during the time they are tied up for greasing.

SUMMARY OF THE INVENTION

In the present invention a greasing assembly is provided in the form of an integral box for attachment directly to a mobile construction machine. This box is compartmentalized into two compartments, one of which has a storage capacity for the grease therein with the other compartment containing a hose for conducting the grease from the greasing assembly to the fitting being lubricated. The mobile construction machine is propelled by an engine which also drives an air compressor which furnishes a source of pressurized air to drive a grease pump located in the greasing assembly to take the grease in the storage compartment and force it through the hose to the grease points. This greasing assembly pump automatically pumps grease through the hose so that the grease gun at the end of the hose, when actuated, will conduct grease under pressure into the fitting but when the gun is detached from the fitting and the trigger released to the normal position, the pump will stop pumping. The greasing assembly pump will automatically return its stroke for an additional quantity of grease when the quantity taken on the first stroke has been dispensed. The greasing assembly is a rugged container adapted to the dusty conditions found at construction sites and enables the greasing of a typical prime mover to be conducted in a fraction of the time previously required, with savings at 1973 prices as high as $50 a day per vehicle and possibly even higher. Also the greasing assembly can be used to lubricate other construction machinery that is adjacent to the equipment.

Many other advantages of the present invention will become apparent from the following description taken in connection with the accompanying drawings.

DESCRIPTION OF THE INVENTION

Figure 1:
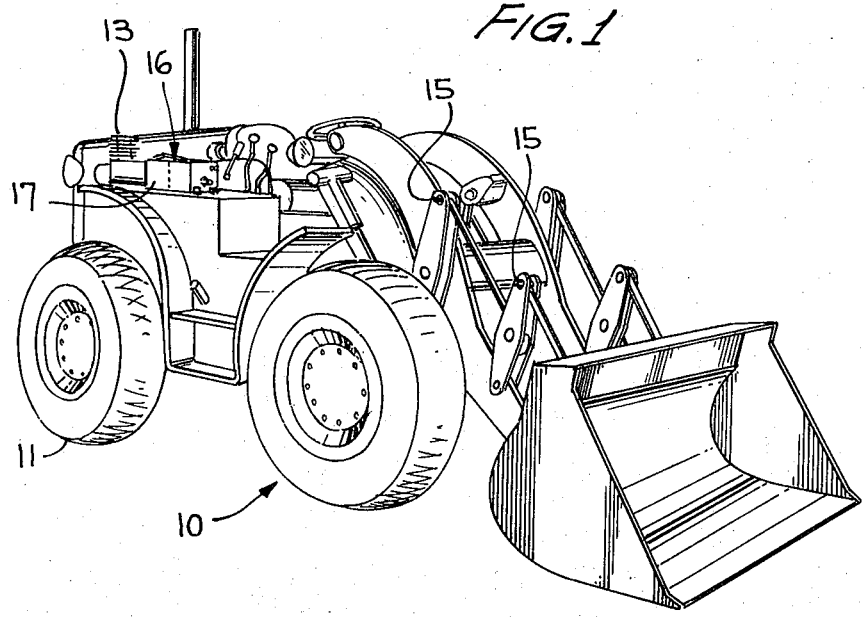
FIG. 1 shows a typical prime mover in perspective view with the greasing assembly associated therewith.
Figure 2:
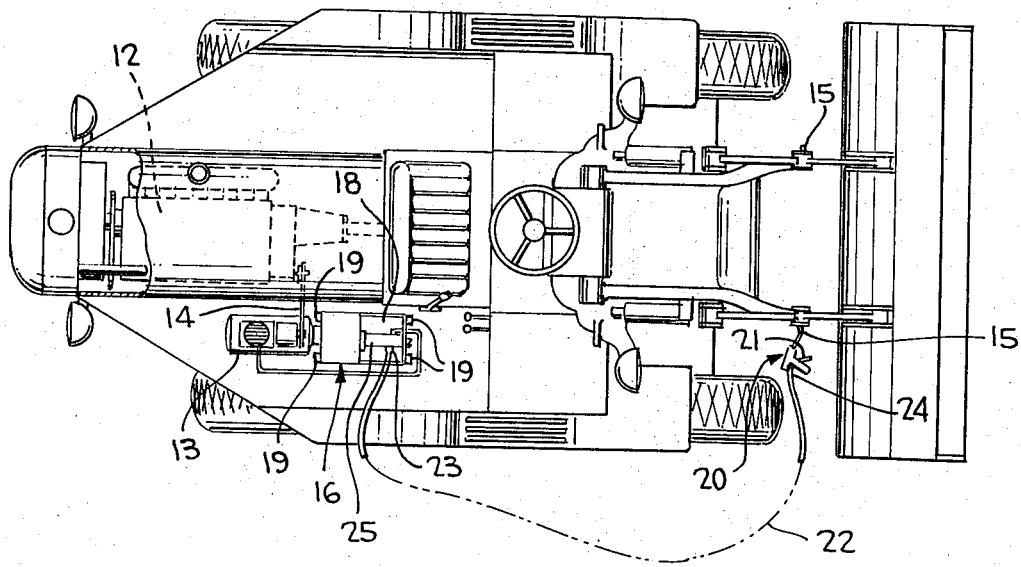
FIG. 2 is a plan view of FIG. 1.
Figure 3:
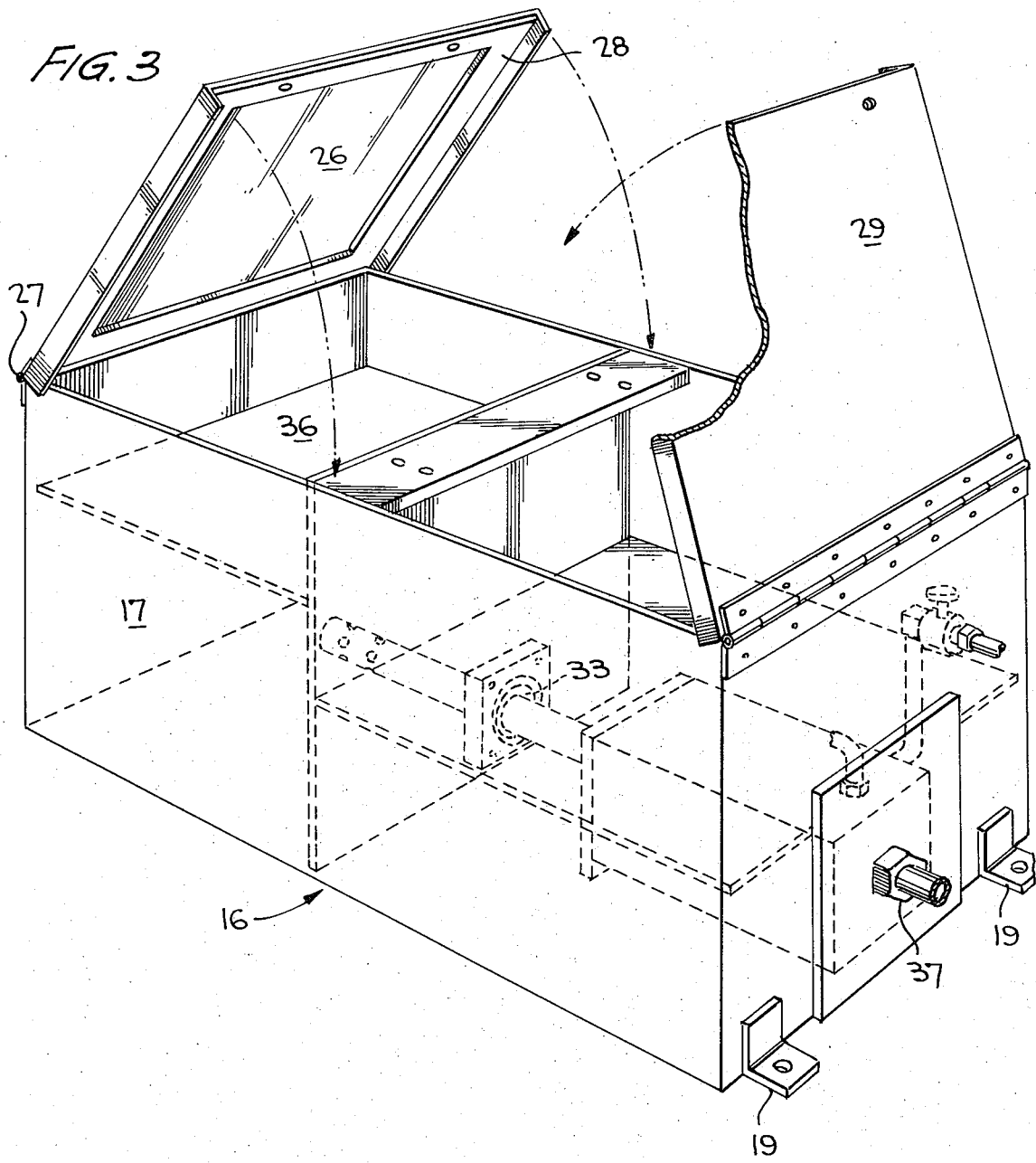
FIG. 3 is a perspective view of the greasing assmebly showing the two compartments and other details with the hinged lids to the two compartments in a semi-raised position.

With reference to FIGS. 1 and 2, there is shown a front end wheel loader 10 of the typical type of mobile construction machines utilized with this invention. Other types of machines that are considered mobile construction machines are dump trucks, double barrel pan loaders, cranes and other similar equipment. Such mobile construction machine is propelled as shown in the figures by wheels 11 which are driven by an engine 12 through a suitable drive means. Of course, the propelling means may be in the form of tracks or other types of propulsion devices driven by a suitable engine. The engine likewise furnishes power for an air compressor 13 through an air compressor drive means 14. The air compressor is driven by the engine and as shown in FIG. 2 the air compressor drive means is connected to the engine through a pulley and belt arrangement.

However, the compressor can be driven directly by an engine or driven by a hydraulic motor connected to a hydraulic pump driven by the engine or may be driven by an electric motor driven through a source of electricity which is either generated by the engine or else from a battery which is charged by a generator driven by the engine or some similar arrangement.

Also grease fittings 15 are shown in FIGS. 1 and 2. These grease fittings are of a well known variety and located convenient to the various points to be greased. Although only several fittings are shown in FIG. 1 and FIG. 2, a machine of this type has 53 grease points. The number of grease points will vary from machine to machine and vary with the type of machine. Also shown in FIGS. 1 and 2 is a greasing assembly which includes a greasing assembly box 16 having a grease compartment 17 located at one end thereof and a hose compartment 18 located at the other end thereof. The greasing assembly box is attached to the machine by box mounting means 19 for attaching the box to the mobile construction machine at a location that is readily accessible from the exterior of said mobile machine so that grease can be placed in the grease compartment and the hose can be taken from and returned to the hose compartment conveniently. As shown in FIG. 2, the mounting means is in the form of four tabs or flanges located at each corner of the box which are bolted to an exterior surface of the machine. Other mounting means can include welding of the box to the machine and other similar arrangements.

As shown in FIG. 2 there is provided a grease control gun 20 having a grease control gun on-off valve trigger 21 which gun and trigger are connected to the grease supply hose 22 at the grease supply hose outlet 24. The grease control gun is of a well known variety readily available on the open market and is of the type that has an outlet which couples with the grease fittings in the usual manner and includes an on-off valve located in its body for shutting the flow of grease on and off when the valve is manually moved through the trigger located on the outside of the gun. Of course, this can be in the form of a trigger akin to a pistol or in the form of a button or other similar valve operator. The grease supply hose inlet 23 is connected to an air motor high pressure grease pump 25 located in the greasing assembly box.

With reference to FIGS. 3, 4, 5 and 6, the details of the greasing assembly box are better shown and it is to be noted that the greasing compartment 17 has a cover 26 connected at one end by hinge 27 so that it may be pivoted to an open position without being detached from the box. Furthermore, the periphery of the under side of the cover is surrounded by a cover gasket 28 so that when the cover is closed there is a tight, relatively dustproof seal between the cover and the grease compartment. At the opposite end of the greasing assembly box the hose compartment has a similar cover 29 connected at one end by hinge 30 for pivotal opening of the cover to reveal the hose compartment so that the hose can be either removed or returned thereto. The hose compartment cover is surrounded by gasket 31 for making the cover reasonably dust-tight to help it protect the contents thereof. The hose compartment and grease compartment are separated by a vertically extending wall 32 which has at its lower end thereof an aperture 33.

Located at the bottom portion of the hose compartment is the air motor high pressure grease pump 25 which is shown schematically. This pump is of a well known variety and the specific one being used is the 2 ½ inches diameter air motor, chassis, high pressure pump 50:1 ratio, series C, Model 81685 or 82716, sold by the Lincoln-St. Louis Division of McNeil Corporation, 4010 Goodfellow Boulevard, St. Louis, Mo. The air motor and controlling portion of the pump is located in the bottom portion of the hose compartment but the pump tube 34 extends horizontally through the separating wall aperture and into the lower portion of the grease compartment. The extreme outer portion of the pump tube is the priming tube 35 which is arranged to be centrally located in the grease compartment at the lower portion of the grease compartment. Located inside the grease compartment is a loose follow through plate 36. As the grease is exhausted from the bottom portion of the grease compartment the plate presses the grease down to provide an even flow of grease to the bottom of the grease compartment where it is picked up by the priming tube. If the priming tube was located substantially out of center, the grease would settle unevenly but the combination of the follow through plate and the central location of the priming tube provides a substantial level settling of the grease as it is removed from the bottom of the compartment. The follow through plate is made of substantially heavy gauge steel which provides sufficient weight for its function.

Figure 4:
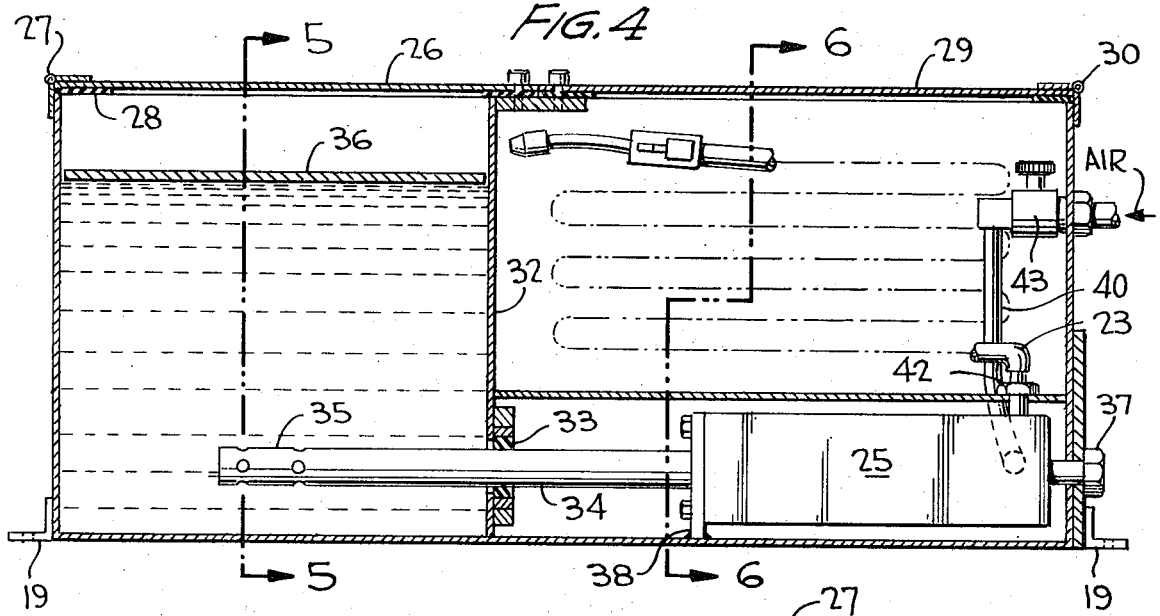
FIG. 4 is a side sectional view of the greasing assembly.
Figure 5:
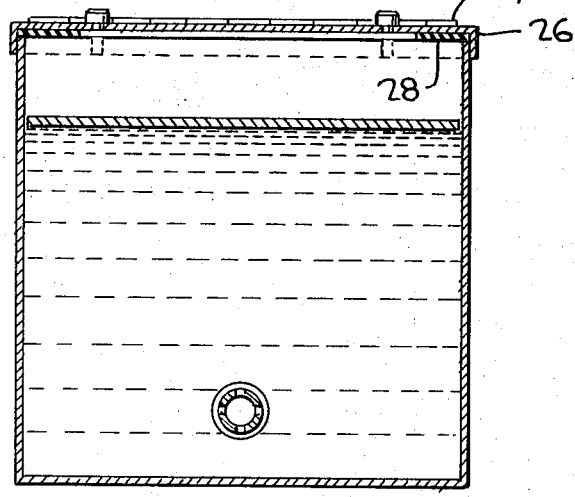
FIG. 5 is a sectional view of the grease compartment taken on Section 5—5 of FIG. 4.
Figure 6:
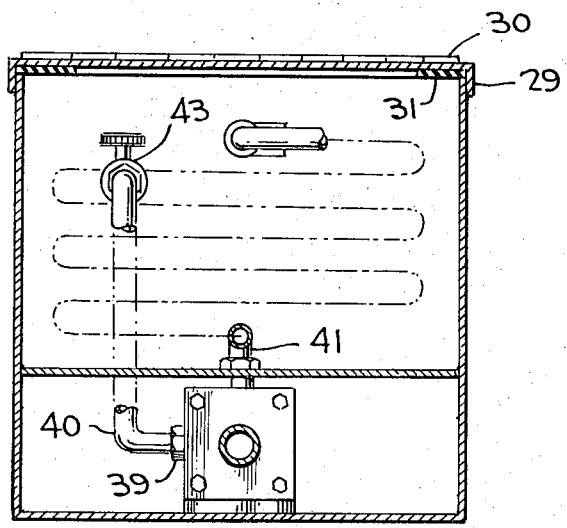
FIG. 6 is a sectional view of the hose and pump compartment taken on Section 6—6 of FIG. 4.

The aperture 33 has a seal located therein to prevent grease from flowing from the grease compartment into the hose compartment which also contains the air motor. In the hose compartment the air motor is fixed therein by means of a holding bolt 37 and well or other holding arrangement 38. The air inlet to the air motor 39 is connected through conduit 40 to the exterior of the greasing assembly box. The grease outlet 41 from the air motor high pressure grease pump 25 is schematically shown in FIGS. 4 and 6 and is connected to the grease supply hose inlet 23. Separating the hose compartment is a floor 42 which keeps the hose off of the air motor grease pump. While the floor is shown as covering the entire area of the hose compartment to separate said compartment into the upper hose retaining chamber and the lower air motor high pressure grease pump chamber, it may simply be a broad flange over the top of the grease pump itself. Also as a variation, instead of the hose being simply coiled into the hose compartment in a loose fashion, it may be coiled onto a reel having a vertical axis for revolving in the hose compartment. This provides a convenient storage arrangement but necessitates the need for a rotary coupling between the reel and the source of the grease.

Also shown in FIGS. 4 and 6 is air source valve 43. This valve is provided to shut off the source of air pressure when the greasing assembly is not being used and to avoid a possible accident of the trigger of the grease control gun being accidentally compressed during storage which would result in all of the grease being automatically pumped from the grease compartment into the hose compartment.

In operation, the greasing assembly box is mounted permanently onto a mobile construction machine in a manner that it is conveniently accessible from the exterior of the machine. An air hose is run from the source of air pressure into the air motor inlet for operating the assembly which marries the integrated greasing assembly to the mobile construction machine. The engine of the construction machine drives the air compressor which usually delivers air to an accumulator (not shown) but may deliver the air directly to the air inlet.

When maintenance time arrives, which may be as frequently as once every 10 hours of use of the machine, the operator stops the machine, opens up the hose compartment and extracts the grease control gun with its attached hose therefrom.

The edges of the compartment may be smooth or guides arranged therein to permit the hose to be easily extracted without catching on the edge.

Prior to this, the grease compartment has had grease placed therein and the follow through plate placed on top of the grease and the cover closed. Also, prior to this, the air source valve has been opened to permit air pressure to flow into the air motor. The grease control gun is then coupled with the first grease fitting and the trigger operated to open the on-off grease valve located in the gun and permit grease to flow under pressure through the fitting and into the parts being lubricated until sufficient lubrication has been replenished, at which time the trigger is released to shut the on-off valve and the gun removed and placed on the next grease fitting to be similarly greased.

The air motor high pressure grease pump functions automatically to provide the pressurized grease as needed and as called for when the on-off valve at the grease control gun is opened. This is carried out in a well known manner by a two way air motor located in the right portion of the air motor high pressure grease pump 25 as shown in FIG. 4. The pump operates an elongated priming plunger which extends through the tube to near its end where it is capped internally by a shovel located in the interior of the priming tube. The grease in the lower compartment flows through the holes at the end of the priming tube where it is picked up by the shovel and shoved to the right of FIG. 4 by means of the air motor piston pulling in that direction under the driving force of the air pressure. As the shovel reaches its rightmost position the valving in the air motor is automatically actuated to switch the valve to cause the air motor and attached shoe to move again to the left in the priming tube to again pick up some grease to move it to the right under pressure. The details of this air motor high pressure grease pump are not shown in the drawings since it is a well known grease pump, available on the open market. Other grease pumps may be used for the supply of the grease from the grease compartment to the grease hose and grease control gun provided they are capable of being operated by power from the mobile construction machine.

As soon as all the greast points have been adequately greased the grease control gun and its connected hose are returned to the hose compartment, the air source valve is shut off and the cover closed. The machine has then been completely greased with a minimum of down time in a convenient fashion and is ready for being put back into operation.

While the invention has been specifically described above, it will be appreciated that it may be embodied in numerous other forms without departing from the spirit or central characteristics thereof. The present embodiment is therefore to be considered in all respects as illustrative and not restrictive, the scope of the invention being indicated by the appendant claims rather than by the foregoing description and all changes which come within the meaning and range of the equivalency of the claims are therefore intended to be placed therein.

What is claimed is:

1. A mobile construction machine comprising:
    a propelling means for said machine,
    an engine for supplying power to said propelling means,
    a means for supplying power from said engine to drive equipment in addition to said propelling means,
    a plurality of grease fittings located on said mobile construction machine,
    a greasing assembly for supplying grease to said grease fittings including a box having a grease compartment and a separate hose storage means for covering and protecting said hose when it is not being used,
    mounting means for attaching said box to said mobile construction machine at a location that is readily accessible from the exterior of said mobile construction machine,
    a grease control gun having means thereon for coupling with said grease fittings for supplying grease thereto,
    a manually operated on-off valve located with said grease control gun for controlling the supply of said grease to said grease fittings,
    a flexible elongated grease supply hose having an inlet end connected to said greasing assembly and an outlet end connected to said grease control gun,
    a cover for said grease compartment,
    grease compression means including a connecting means between said source of power from said engine and said greasing assembly for creating a pressure on at least part of said grease to force it through said grease supply hose and said grease gun into said grease fitting for lubricating said mobile construction machine.

2. The machine of claim 1 wherein said engine drives an air compressor which supplies air to said grease compression means, said grease compression means being an air driven grease pump whose inlet is located in substantially the center of the lower portion of said grease compartment.

3. The machine of claim 2 wherein said air driven grease pump includes an air motor portion and a pump tube portion containing said grease pump inlet with said pump extending in a horizontal direction across the bottom portion of said greasing assembly box and said hose storage means is a hose compartment located in said greasing assembly box, said air motor portion being located in the bottom of said hose compartment and the said pump tube portion extending through a separating wall into said grease compartment.

4. The machine of claim 3 which includes a follow through plate overlying any grease in said grease compartment and covers for said grease and hose compartments.

5. The machine of claim 4 which includes a valve between said air motor portion and said air compressor and said grease compartment cover being pivotly mounted and including a gasket so as to provide a substantially dust tight seal with said grease compartment.

6. A greasing assembly for permanently mounting on a mobile construction machine having a source of compressed air and at least several grease fittings for use in periodically manually greasing said machine through said grease fittings, comprising:
    a generally rectangular box,
    a grease compartment in said box,
    a hose compartment in said box,
    a vertical wall separating said grease compartment from said hose compartment,
    an aperture located in the lower portion of said separating wall,
    an air driven grease pump including an air motor portion and an attached pump tube portion having a grease inlet end, said air motor portion being located in the bottom portion of said hose compartment and said pump tube portion extending horizontally through said aperture and into said grease compartment,
    a flexible elongated grease supply hose having an outlet and an inlet connected to said air driven grease pump,
    a grease control gun for coupling with grease fittings, and
    a manually operated on-off valve located with said grease control gun for controlling the supply of grease connecting to the outlet end of said grease supply hose.

7. The greasing assembly of claim 6 wherein said grease inlet end of said pump tube portion is located approximately at the center of the bottom portion of said grease compartment.

8. The greasing assembly of claim 7 wherein said grease compartment has a follow through plate overlying any grease in said grease compartment.

9. The greasing assembly of claim 8 wherein said grease compartment and said hose compartment each has covers mounted thereon with at least the grease compartment having a relatively dust tight fit between its cover and the compartment.

10. The greasing assembly of claim 9 wherein said box has an inlet for connecting to a source of air pressure and includes a valve between said air driven grease pump and said air pressure source inlet.

* * * * *